C. H. HALLAUER.
FRUIT WASHER.
APPLICATION FILED JULY 7, 1908.

935,201.

Patented Sept. 28, 1909.

Witnesses:—
Louis W. Gratz.
Frank L. Graham.

Inventor
Carl H. Hallauer
by Townsend Lyon Haenley
His Attys

UNITED STATES PATENT OFFICE.

CARL H. HALLAUER, OF LOS ANGELES, CALIFORNIA.

FRUIT-WASHER.

935,201.

Specification of Letters Patent. Patented Sept. 28, 1909.

Application filed July 7, 1908. Serial No. 442,388.

*To all whom it may concern:*

Be it known that I, CARL H. HALLAUER, a citizen of the United States, residing at Los Angeles, in the county of Los Angeles and State of California, have invented a new and useful Fruit-Washer, of which the following is a specification.

This invention relates to fruit washers and has for its object to provide means whereby the fruit may be washed and thoroughly cleansed without the danger of bruising or abrading the surface or skin as frequently happens when the fruit is cleansed by use of the ordinary brush washing machine.

Another object is to provide mechanism by which the course or passage of the fruit through the machine may be reversed or caused to go in the opposite direction.

Another object is to provide means for causing the sediment to be deposited in the tank and thereby prevent its passage through the perforated pipes where it would have a tendency to clog up or stop the jets or openings and thereby prevent the machine from performing its operation satisfactorily.

With these and other objects in view the invention consists in the improved construction and novel arrangement of parts of a fruit washer as will be hereinafter more fully set forth.

Figure 1:
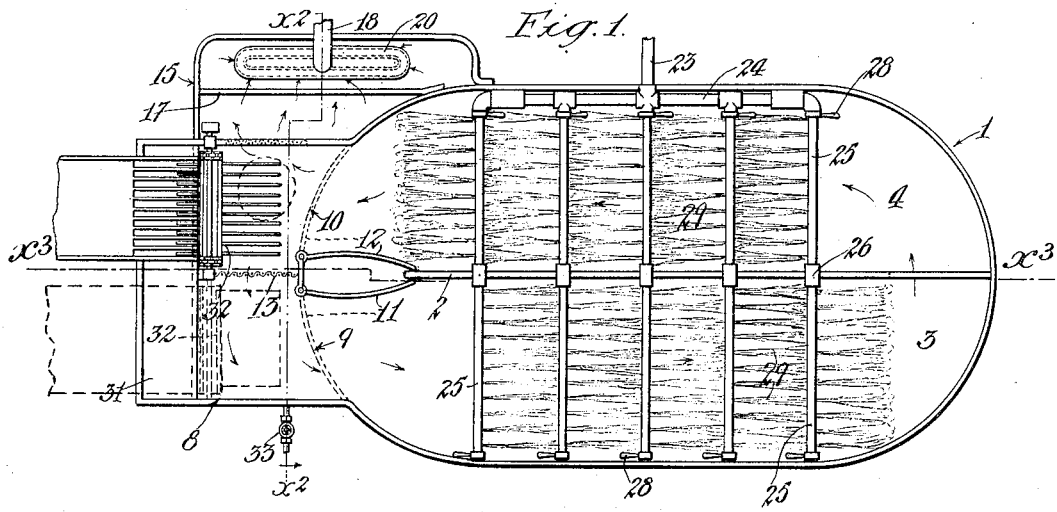
Figure 2:
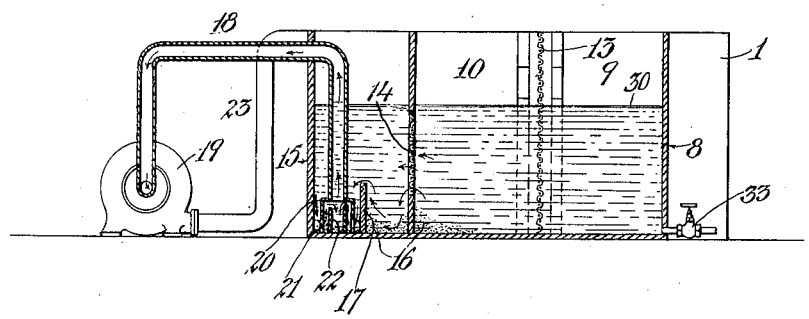
Figure 3:
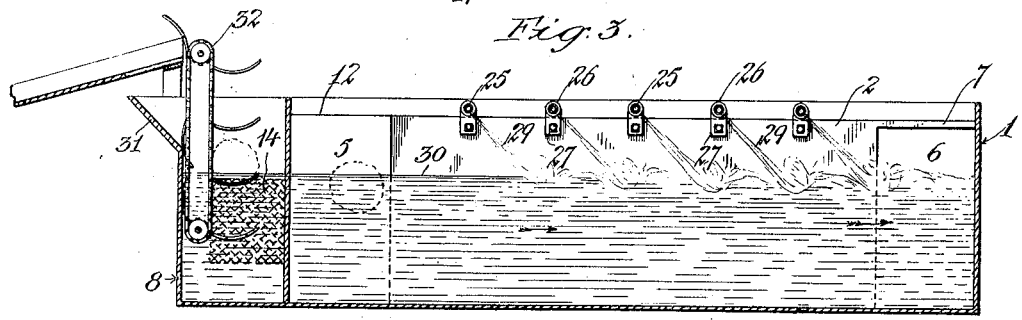

In the accompanying drawings which illustrate the invention and form a part of this specification; Figure 1 is a top plan view of a machine made in accordance with my invention. Fig. 2 is a vertical, transverse, sectional view on the line $x^2$—$x^2$ of Fig. 1 looking in the direction of the arrow. Fig. 3 is a longitudinal, vertical, sectional view of the machine on the line $x^3$—$x^3$ Fig. 1.

Referring more particularly to the drawings, 1 indicates the tank which may be of any desired form and size, it being shown substantially elliptical or oval in the drawings. A vertical partition 2 extends nearly from one end to the other substantially centrally of the tank, thereby dividing the tank into two compartments 3 and 4. By terminating the partitions at a distance from the walls of the tank 1, passages 5 and 6 are formed at the respective ends of the partition which thereby afford a continuous passage around the tank and, if desired, a bridge or brace 7 may be extended from one or both ends of the partition to the wall of the tank to assist in holding the parts in place.

Formed upon or connected with one end of the tank 1 is a supplemental tank or compartment 8 which communicates with the compartments 3 and 4, respectively, of the tank 1 through openings 9 and 10. Two doors 11 and 12 are connected with the wall of the tank 1, as by hinges, and are adapted to be swung back and forth so as to close the passages 9 and 10 and 5 as the case may be. These doors are preferably curved to correspond with the curvature of the end of the tank, as clearly shown in Fig. 1.

A vertical, perforated partition 13 extends from the front wall of the compartment 8 to the wall of the tank 1 between the connections therewith of the doors 11 and 12, and one side of the compartment 8 is provided with an opening which is provided with a screen 14, as of woven wire similar to the partition 13. Another tank 15 is formed at or connected with one side of the tanks 8 and 1 which forms a settling chamber for dirt and other sediment 16, as shown more clearly in Fig. 2. A shallow wall or partition 17 extends substantially longitudinally of the tank 15 and thereby divides the bottom of said tank into two compartments, upon one side of which partition is located an inlet to a pipe 18, which pipe has its opposite end connected with a suitable pump 19. The inlet or lower end of the pipe 18 is preferably enlarged or expanded, as shown at 20, and has its lower end provided with openings 21. Located within this expanded portion 20 is a vertical wall 22 forming a cup like receptacle substantially in alinement with the lower end of the pipe 18.

Leading from the pump 19 is a pipe 23 which has its free end located at the top of the tank 1 and connected with a cross pipe 24. A series of perforated pipes 25 are connected with the pipe 24 and extend transversely across the top of the tank 1 with their central portions provided with couplings 26 which rest upon or are secured to the upper edge of the partition 2 as by means of fasteners 27. Each section of each pipe 25 is provided preferably at its ends with handles 28 by means of which it may be rotated so as to vary the positions of the perforations in the bottoms of said pipes so as to cause the jets of water 29 issuing therefrom to be directed at any suitable angle relatively to the top or surface of the water 30 within the tank.

The forward side of the tank 8 is preferably inclined upwardly and outwardly, as shown at 31, to permit of the removal of the fruit by hand, if desired, or a suitable elevator 32 of any ordinary form and construction may be provided which can be inserted into the tank 8 for removing the fruit mechanically. The elevator and pump 19 may be driven by any suitable power, not shown, and the water can be withdrawn from the tank through an ordinary valve 33.

In using a fruit washer as above described, the tank is first filled with water to any desired height, preferably to a point above the screen 14 as shown in Fig. 2. The pump is then started which will withdraw the water through the pipe 18 and force it through the pipe 23 to the perforated pipes 25, where it issues in strong jets down against the surface of the water in the tank at any suitable angle, the pipe sections 25 having been properly adjusted by means of the handles 28. By arranging the jets in the pipes upon one side of the partition to all project in one direction, and the jets from the sections upon the other side to project in the opposite direction it is evident that the water in the tank will be given a circulation or movement around within the tank. The oranges, or other fruit as lemons, etc., are then emptied into the tanks 8 and 1 until a sufficient amount of fruit has been put in to be cleansed at one time, the doors between said tanks having previously been opened.

The circulation or movement of the water in the tank 1, as above referred to, will cause the fruit to be carried under the jets from the pipes 25 where it will be subjected to the washing action of the various jets and at the same time will be rotated or turned over and over so as to expose different portions of the surface to the action of the jets. If the fruit has not been sufficiently cleaned by one passage around the tank 1, the doors 11 and 12 are closed which will cause the fruit to be circulated around in the tank 1 until it has been thoroughly cleansed, after which one of the doors is opened which will permit of the fruit passing into the compartment 8 from whence it can be removed by hand over the inclined side 31 or by the conveyer 32. While the fruit has thus been circulating within the tank 1, additional fruit may have been emptied into the tank 8 upon the side of the partition 13 opposite the conveyer ready to be passed into the tank 1 as soon as the first batch of fruit has been cleansed ready for removal. As soon as the first batch of fruit is to be removed one of the doors as 12 is opened which will permit the water to flow into the tank 8 and from there it will be forced back into the tank 1, thereby automatically opening the gate 11 and permitting the fruit to pass with it into the tank 1, or the gate 11 may be opened manually as desired. After the fruit has entered the tank 1 in this manner, or by being dumped over the side of the tank 1, if so desired, the door 12 is then closed as before which will cause the current of water to be thrown against the gate 11 and will thereby force it into its closed position and cause the fruit and water to be circulated as above described. Where it is not desired or necessary to cause the fruit to be circulated more than once around the tank 1, the two doors 11 and 12 are fastened in the position shown in Fig. 1, and the fruit will then pass directly from one side of the tank 8 around the tank 1 and be delivered to and discharged from the other side of said tank as above described.

As the sections 25 of the jet pipes may be rotated so as to cause the jets 29 to be projected upon either side of a vertical line it is evident that by giving them the proper rotation the water in the tank 1 can be caused to circulate in either direction, and as the doors 11 and 12 are similar in construction and operation they will perform the same functions as above described irrespective of the way the water is being circulated around the tank 1, and as the elevator 32 is so constructed that it can be moved from one side to the other of the partition 13, as indicated by dotted lines in Fig. 1 as will be understood, the fruit can be removed from either side of the tank 8 so as to adapt the washer for use in different positions or locations according to circumstances. As the water and fruit are being thus circulated the pump is constantly withdrawing the water from the tank through the pipe 18 and forcing it through the pipe 23, and by locating the inlet to the pipe 18 at the bottom of the tank and at one side thereof, and by arranging the partitions and other means around the inlet as above described, comparatively still water is secured at the entrance to the pipe, whereby the sediment that may have been washed from the oranges is permitted to settle upon the bottom of the tanks instead of being drawn into the pipe and eventually forced through the jet openings of the sections 25 where it would be liable to clog up said openings and prevent the operation of the machine. By arranging the top of the screen a trifle below the surface of the water, the leaves and other like substances that may find their way into the tank are prevented from getting upon the screen 14 and thereby clogging it.

By constructing a fruit washer as above described, the fruit can be thoroughly cleansed without any danger of bruising or abrading the surface of the skin which would have a tendency to cause the fruit to decay. The fruit can be rapidly and quickly cleansed as all portions of its surface are repeatedly exposed to the action of the jets as the fruit is caused to pass and repass, if necessary, under the series of jets. The capacity of the washer can be made as large as desired by simply increasing the size of the tanks and the number of the jet pipes. But comparatively little power will be required to operate the same and that power may be of any kind that is most convenient.

Having described my invention, I claim:—

1. In a fruit washer, an oblong tank provided with a centrally arranged, vertical partition terminating at a distance from the ends of the tank, jet pipes arranged transversely across the top of the tank having means for rotating them axially to vary the angle of the jets issuing therefrom relatively to a vertical line through the axis of said pipes.

2. In a fruit washer, an oblong tank provided with closable openings at one end and a partition extending longitudinally thereof and terminating at a distance from the ends of the tank, means for closing said openings or the space at one end of said partition, a tank at one end of the first mentioned tank and adapted to communicate therewith through said openings, and means provided with jet openings for causing water to be circulated through said tanks and openings or only around the partition.

3. In a fruit washer, a two compartment tank provided with openings at one end, means for closing said openings, a tank communicating with said first mentioned tank through said openings and provided with a perforated partition, rotatable jet pipes arranged transversely of and above the first mentioned tank, a pump communicating with the second tank adapted to remove water therefrom and force the same through said jet pipes and means for causing the sediment in the water to be deposited before said water enters the pump.

4. In a fruit washer, an oblong tank provided with openings at one end and a centrally arranged, vertical partition terminating at a distance from the ends of said tank, two doors hinged to the wall of said tank in position for closing said openings therein or the passage between one end of said partition and the end of the tank, a two compartment tank communicating with the first mentioned tank through said openings, having one wall provided with a screened opening, a tank communicating with said screened opening provided with a settling chamber, a pump having the inlet of its intake pipe located in said chamber and its outlet provided with rotatable jet pipes.

5. In a fruit washer, an oblong tank provided with closable openings at one end and a vertical partition arranged centrally of the tank, a two compartment tank communicating with the first tank through said openings and having a screened opening at one side, a tank communicating with said side having a shallow partition arranged longitudinally thereof, a pump having the inlet of its intake pipe located upon one side of said partition and enlarged and provided with openings at its bottom, a wall from the bottom of said last mentioned tank extending up into said enlarged inlet, and rotatable jet pipes arranged transversely of the first mentioned tank and communicating with the outlet pipe of said pump.

In testimony whereof, I have hereunto set my hand at Los Angeles, California, this 30th day of June 1908.

CARL H. HALLAUER.

In presence of—
P. H. SHELTON,
FRANK L. A. GRAHAM.